United States Patent [19]

Hayama et al.

[11] Patent Number: 4,976,116
[45] Date of Patent: Dec. 11, 1990

[54] COLD-AIR GENERATING DEVICE

[75] Inventors: Masaharu Hayama, Yamatotakada; Kenji Takaoka, Amagasaki; Yasushi Torai, Matsudo; Toshiharu Fukada, Soka, all of Japan

[73] Assignee: Nihon Medix Co., Ltd., Chiba, Japan

[21] Appl. No.: 370,752

[22] Filed: Jun. 23, 1989

[30] Foreign Application Priority Data

Jul. 28, 1988 [JP] Japan .................. 63-189090

[51] Int. Cl.⁵ ............................................. F25D 11/02
[52] U.S. Cl. ......................................... 62/441; 62/510
[58] Field of Search ................. 62/441, 442, 510, 283, 62/93

[56] References Cited

U.S. PATENT DOCUMENTS

| | | | |
|---|---|---|---|
| 2,493,488 | 1/1950 | Jordan et al. | 62/442 X |
| 2,755,634 | 7/1956 | Simmons | 62/441 X |
| 4,759,195 | 7/1988 | Biancardi | 62/283 |

Primary Examiner—Lloyd L. King
Attorney, Agent, or Firm—Cushman, Darby & Cushman

[57] ABSTRACT

Disclosed is a cold-air generating device which comprises a first refrigerating system 15 including a first evaporator 1 and a compressor 4 and adapted to cool air to such a degree that the water contained therein will not become frozen, and a second refrigerating system 26 including a second evaporator 2 and a compressor 16 and adapted to further refrigerate the air dehumidified and cooled while passing through the first evaporator 1 down to a temperature below freezing point. Air inlets 27 and 28 may be provided in the upper sections of the first and second evaporators 1 and 2, respectively, so that a downward airflow will be generated therein, the respective lower sections of the first and second evaporators 1 and 2 being connected to each other through a drain pan 3. Furthermore, gauze 29 may be provided on that side of the second evaporator 2 which is connected to the first evaporator 1.

2 Claims, 2 Drawing Sheets and an electromagnetic valve for changing cycles. In its refrigeration cycle, which is designed to enable switching between dehumidification and air-conditioning operations, a by-pass circuit is formed in parallel with the liquid tank so that, during dehumidification, the refrigerant will be conveyed to the reheater instead of being passed into the liquid tank.

COLD-AIR GENERATING DEVICE

BACKGROUND OF THE INVENTION

This invention relates to a cold-air generating device, and in particular, to a cold-air generating device which employs a plurality of evaporators and compressors, thereby improving the evaporator heat exchange efficiency and making it possible to reduce the level of starting current needed.

An example of conventional cold-air generating device of this type is disclosed in Japanese Utility-Model Publication No. 48-22155.

The conventional device disclosed therein is equipped with a refrigerant compressor, a condenser, a liquid tank, an evaporator, a reheater, a capillary tube and an electromagnetic valve for changing cycles. In its refrigeration cycle, which is designed to enable switching between dehumidification and air-conditioning operations, a by-pass circuit is formed in parallel with the liquid tank so that, during dehumidification, the refrigerant will be conveyed to the reheater instead of being passed into the liquid tank.

It has been the practice with conventional cold-air generating devices of the above-described type to use a blowing compressor when the air is to be refrigerated down to a temperature of 0° C. or below (−20° C. to −80° C.).

Such a compressor, however, involves noise and vibration, and requires additional capacity, which makes the cold-air generating device unsuited for medical use.

In regard to power capacity, it may be noticed that, given a limited power source of AC100 V, the output of commercially available blowing compressors is 0.75 KW or less.

If a blowing compressor with an output of 0.75 KW is used, the starting current required will be 50 A or so. Consequently, a dedicated power source will have to be provided in order to start this blowing compressor. This requires extra electrical work.

If such extra electrical work is not to be performed, the output of the blowing compressor must be below 0.4 KW. In the case of a commercially available blowing compressor with an output of 0.4 KW, the airflow volume is a little less than 50 l/min, a value which is too low for use in a medical apparatus for cryotherapy.

To refrigerate air down to a temperature of 0° C. or below (−20° C. to −80° C.), a single evaporator is not enough because almost all the water contained in the air will then turn into ice and adhere to the surface of the evaporator. If air at a temperature of 20° C. and with a relative humidity of 60% is cooled down to −30° C., about 10 g of ice per 1 m³ air adheres to the evaporator surface. If the air is allowed to flow at a rate of 100 l/min, 60 g of ice per hour will adhere to the surface. Accordingly, if the air is allowed to flow for a long time, the smoothness of the flow will be impaired, resulting in the evaporator providing a poor heat exchange efficiency.

Besides this, provision of a single evaporator requires that its size be considerably large; the refrigerating compressor should also be large. Since only one refrigerating compressor is provided, the current required for starting it is relatively large as compared with the case where two refrigerating compressors are provided (the starting current that flows is about four or five times as large as the rated current), and poor starting may be the result if the power capacity is relatively small. If starting problems occur, some extra electrical work has to be conducted for the purpose of raising the power capacity.

SUMMARY OF THE INVENTION

This invention aims at eliminating the above-mentioned problems encountered in prior art devices.

It is accordingly an object of this invention to provide a cold-air generating device in which the evaporator heat exchange efficiency is improved and the starting current reduced by using a plurality of evaporators and compressors.

The above object is attained in accordance with this invention which provides a cold-air generating device comprising: a first evaporator for cooling the air conveyed from a blowing compressor or a blower to such a degree that the water contained therein will not be frozen; a second evaporator for further refrigerating the air which has been dehumidified and cooled passing through the first evaporator down to a temperature below freezing point; a first compressor for the first evaporator; and a second compressor for the second evaporator. Preferably, a blower is arranged in such a manner that a downward airflow is generated in the first evaporator, and a drain pan is provided which connects the first evaporator to the second evaporator in such a manner that an upward airflow is generated in the second evaporator. Further, gauze may be provided on that side of the second evaporator which is connected to the first evaporator.

In the above construction, the air from the blower enters the first evaporator for dehumidification, and is not only dehumidified but also cooled down by the first evaporator to a temperature of about 2° C., i.e., to such a degree that the water removed therefrom as a result of oversaturation will not become frozen. Upon oversaturation, part of the water contained in the air is removed therefrom, and gathers in a drain pan 3 provided below the first evaporator, to be periodically discharged out of the system. The air cooled down to about 2° C. enters the second evaporator for refrigeration, and is refrigerated to about −30° C. The water contained in the air is then turned into ice, and will adhere to the surface of the second evaporator. However, since about 80% of the water contained at first in the air has been removed in the first evaporator, it is only the rest, i.e., about 20% of the water that actually adheres to the surface. As a result, adhesion of ice to the first and second evaporators will not occur easily, so that the airflow can be kept smooth. Furthermore, the starting of the first and second compressors can be staggered, which helps to reduce the level of starting current needed overall. This is also advantageous in that noise can be reduced to a minimum, and that the heat exchange efficiency of the evaporators can be improved because of the reduced degree of ice adhesion. Thus, the device can supply cold air in a stable manner for a long period of time. In addition, the size of the device itself can be made smaller than in the prior art.

DETAILED DESCRIPTION OF THE PREFERRED EMBODIMENTS

An embodiment of this invention will now be described with reference to the accompanying drawings.

Figure 1:
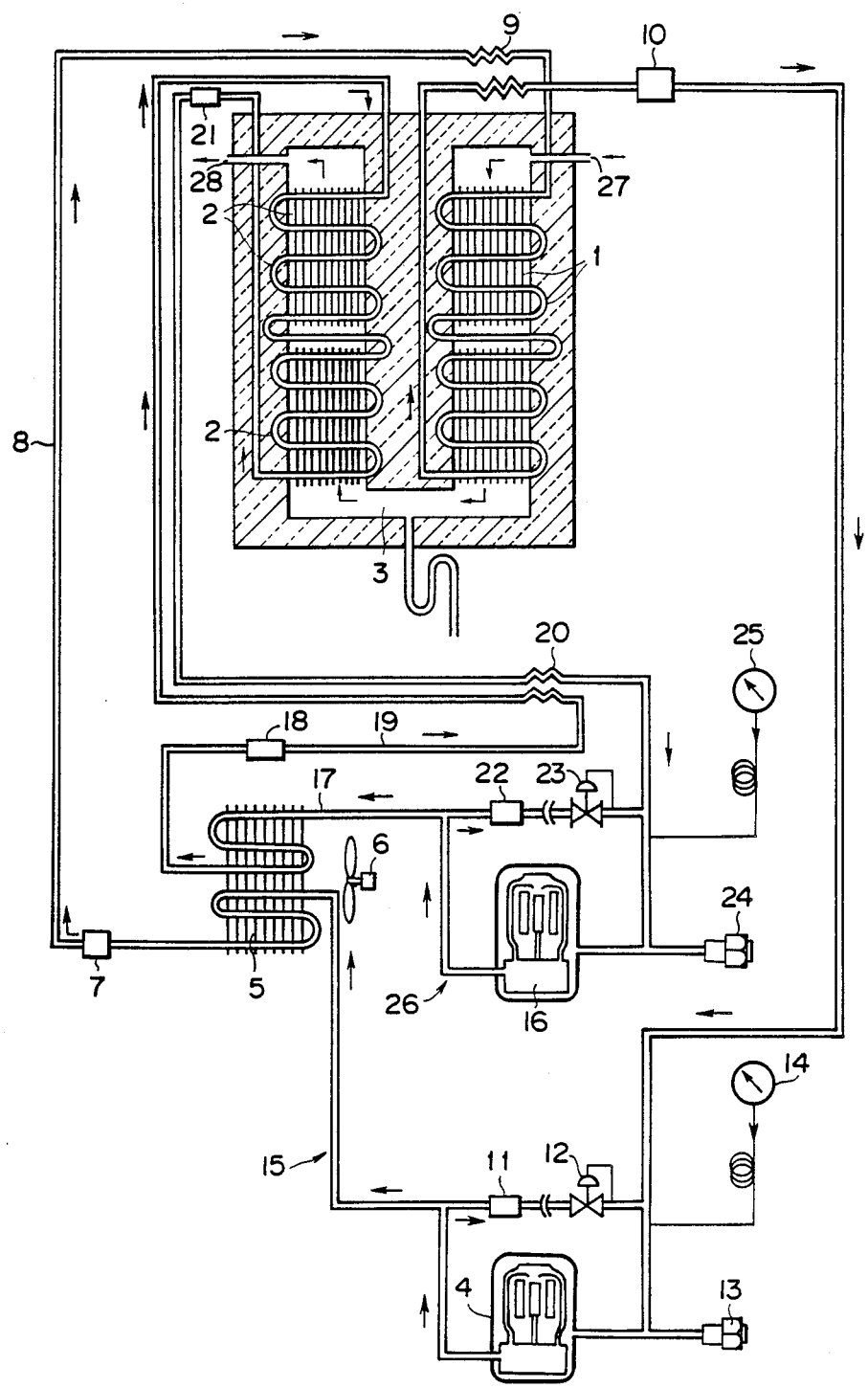
FIG. 1 is a diagram illustrating the construction of a cold air generator in accordance with this invention.

As shown in FIG. 1, the evaporator of the cold-air generating device of this invention is divided into a first evaporator 1 for dehumidification which is adapted to dehumidify air to such a degree that the water contained therein will not become frozen, and a second evaporator 2 for refrigeration which communicates with the first evaporator 1 through a drain pan 3 and is adapted to refrigerate the air to be dehumidified by the first evaporator 1 to a temperature below freezing point. The first evaporator 1 forms a first refrigerating system 15 together with a first compressor 4 for dehumidification, a condenser 5 equipped with a cooling fan 6, a liquid filter drier 7, a capillary tube 8, a heat economizer 9, an accumulator 10, a by-pass filter 11, a hot-gas by-pass valve 12, a suction line check valve 13, and an evaporator gage 14. The second evaporator 2 forms a second refrigerating system 26 together with a compressor 16 for refrigeration, a condenser 17, a liquid filter drier 18, a capillary tube 19, a heat economizer 20, an accumulator 21, a by-pass filter 22, a hot-gas by-pass valve 23, a suction line check valve 24, and an evaporator gage 25.

The first evaporator 1 includes an air inlet 27 for receiving air supplied by a blower (not shown), the second evaporator 2 having an air outlet 28 for the air which has been cooled and dehumidified.

Figure 2:
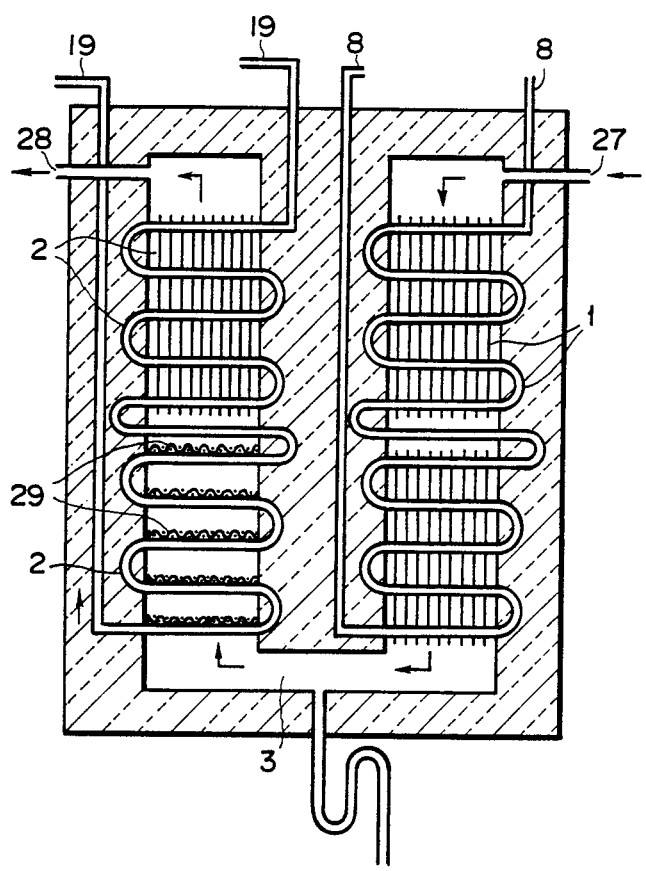
FIG. 2 is an enlarged view showing the construction of the evaporator used in the device.

FIG. 2 shows an embodiment of the evaporator of this invention in more detail than FIG. 1. The above-mentioned air inlet 27 is provided in the top section of the first evaporator 1 so that a downward airflow may be generated in the first evaporator 1. Provided in the lower section (upstream side) of the second evaporator 2 is gauze 29, an air outlet 28 being provided in the top section of the second evaporator 2 so that an upward airflow may be generated in the second evaporator 2.

The operation of the cold-air generator having the above construction will now be described.

As shown in FIGS. 1 and 2, the air supplied by the blower (not shown) enters the first evaporator 1 for dehumidification, and is cooled down to about 2° C., i.e., to such a degree that the water removed from the air will not become frozen.

Upon oversaturation at about 2° C., part of the water contained in the air is removed therefrom, and gathers in the drain pan 3 provided below the first evaporator 1, to be periodically discharged therefrom.

Afterwards, the air cooled down to about 2° C. enters the second evaporator 2, where it is refrigerated to about −30° C.

During this process, the water contained in the air is turned into ice, and adheres to the surface of the second evaporator 2. Since about 80% of the water originally contained in the air is removed by the first evaporator 1 (where the air temperature at the blower inlet is 30° C. and the relative humidity is 100%), the amount of ice actually adhering to the evaporator surface a that time is the rest of the water originally contained, i.e., 20% of the original amount.

Consequently, when cooling a certain amount of air, the amount of water contained in the air entering the second evaporator 2 does not exceed a certain value since the air has been cooled down to about 2° C. and dehumidified in the first evaporator 1. This implies that the amount of ice adhering to the surface of the second evaporator 2 does not exceed a certain value either, so that the amount of adhering ice, which increases in proportion to the operating time, is accordingly smaller than in prior art devices.

Furthermore, it is to be noted that, given a certain amount of air and a certain length of operation time, the amount of adhering ice is determined in proportion to these values. Accordingly, any problem due to ice adhesion can be avoided by appropriately determining the evaporator size.

As shown in FIG. 2, the air supplied from the blower enters the first evaporator 1, which is so designed that the airflows downwardly therein so that the water which has been removed therefrom as a result of over-saturation can positively flow down to the drain pan 3 provided below.

Since the airflow and the water movement occur in the same direction and the water removed from the air positively flows down to the drain pan 3, dehumidification can be effected in a stable manner.

On the other hand, the second evaporator 2 is so designed that an upward airflow is generated therein so that any frost generated within it is prevented from escaping. If any frost which has grown in the second evaporator were allowed to escape from it, some of it would adhere to the air outlet 28 of this evaporator, resulting in clogging of the air outlet 28.

Furthermore, gauze 29 may be provided in the lower section (upstream section) of the second evaporator 2, which brings about a remarkable augmentation of the frost accumulation capacity of the second evaporator. This arrangement helps to avoid clogging in the upper section (downstream section) of the second evaporator 2, and maintains the refrigerating performance of the device, thereby allowing the device to be operated for long period of time.

If the lower section of the second evaporator 2 were of the same construction as the upper part thereof (fin type), the device would be hard to operate for a long period of time because the frost accumulation capacity provided between the fins would be rather small. The provision of the gauze 29 provides an improvement in this regard; it makes it possible to supply an air at −30° C. for 12 hours at a flow rate of 100 l/min.

By staggering the starting of the above-mentioned first and second refrigerating systems 15 and 26, the starting current for starting the compressors can be reduced as compared with the case where a large compressor is used.

With the construction described above, the device of this invention can provide the following advantages:

In the cold-air generating device as claimed in claim 1, the first and second evaporator are so designed that the adhesion of ice thereto can be avoided to a considerable degree, so that the airflow therein is not hindered. Furthermore, by staggering the start of the first and second compressors, the total starting current required is less than in prior art devices. This arrangement also makes it possible to lower the noise level. Since the amount of ice which adheres is relatively small, cold air can be supplied in a stable manner for a long period of time. In addition, the size of the device can be smaller than that of conventional devices.

The cold-air generating device as claimed in claim 2 provides the advantage that any frost which grows in the evaporator is prevented from escaping In the cold-air generating device as claimed in claim 3, a greater amount of frost can be accumulated than in the prior art. This helps to prevent the upper section of the second evaporator from clogging up, and maintains the refrigerating performance of the device, thereby making it possible to operate the device for a long period of time.

What is claimed is:

1. A cold-air generating device, comprising:

refrigeration cycle means which includes compressor means, condenser means and evaporator means;

said evaporator means consisting of a plurality of evaporators including a first evaporator and a second evaporator;

said compressor means including a first compressor and a second compressor;

said first evaporator and said first compressor in combination providing a first refrigeration cycle which cools air to such a degree that the water contained therein will not become frozen;

said second evaporator and said compressor in combination providing a second refrigerating cycle which further refrigerates the air to be dehumidified and cooled while passing through the first evaporator, down to a temperature below the freezing point of water contained in the air;

an air inlet being provided in an upper section of said first evaporator so that a downward airflow is generated therein;

an air-outlet being provided in an upper section of said second evaporator so that an upward airflow is generated therein;

the respective low sections of the first and second evaporators being connected to each other through a drain pan.

2. A cold-air generating device, comprising:

refrigeration cycle means which includes compressor means, condenser means and evaporator means;

said evaporator means consisting of a plurality of evaporators including a first evaporator and a second evaporator;

said compressor means including a first compressor and a second compressor;

said first evaporator and said first compressor in combination providing a first refrigeration cycle which cools air to such a degree that the water contained therein will not become frozen;

said second evaporator and said compressor in combination providing a second refrigerating cycle which further refrigerates the air to be dehumidified and cooled while passing through the first evaporator, down to a temperature below the freezing point of water contained in the air;

gauze being provided on that side of said second evaporator which is connected to said first evaporator.

* * * * *